United States Patent
Sailer et al.

(10) Patent No.: US 9,914,444 B2
(45) Date of Patent: Mar. 13, 2018

(54) METHOD AND CONTROL DEVICE FOR OPERATING A ROAD-COUPLED HYBRID VEHICLE

(71) Applicant: Bayerische Motoren Werke Aktiengellschaft, Munich (DE)

(72) Inventors: Michael Sailer, Mering (DE); Christian Wimmer, Munich (DE); Jan Felten, Neufahrn (DE); Dirk Odenthal, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 4 days.

(21) Appl. No.: 14/492,757

(22) Filed: Sep. 22, 2014

(65) Prior Publication Data

US 2015/0088356 A1    Mar. 26, 2015

(30) Foreign Application Priority Data

Sep. 23, 2013   (DE) .................. 10 2013 219 085

(51) Int. Cl.
*B60W 10/08*   (2006.01)
*B60W 10/06*   (2006.01)
(Continued)

(52) U.S. Cl.
CPC .............. *B60W 10/08* (2013.01); *B60K 6/52* (2013.01); *B60W 10/06* (2013.01); *B60W 20/10* (2013.01);
(Continued)

(58) Field of Classification Search
None
See application file for complete search history.

(56) References Cited

U.S. PATENT DOCUMENTS 7,565,937 B2 *  7/2009  Deguchi ............. B60L 15/2036
                                                    180/253
7,739,005 B1 *  6/2010  Tang ........................ B60L 3/10
                                                    701/22

(Continued)

FOREIGN PATENT DOCUMENTS

CN          101774346 A      7/2010
CN          102826087 A      12/2012
(Continued)

OTHER PUBLICATIONS

German Search Report dated Jul. 17, 2014 with partial English translation (11 pages).

(Continued)

*Primary Examiner* — Rami Khatib
*Assistant Examiner* — Nicholas K Wiltey
(74) *Attorney, Agent, or Firm* — Crowell & Moring LLP

(57) ABSTRACT

A method and a control device are provided for operating a road-coupled hybrid vehicle. The hybrid vehicle has an electronic control unit, a primary motor associated with a first axle, and a secondary motor associated with a second axle. By way of the electronic control unit, the primary motor and the secondary motor are basically controlled in a drive-oriented manner such that preferentially only a single-axle drive by the primary motor is provided. Beginning with the secondary motor switched off, when a traction requirement is determined, the secondary motor is switched on, regardless of whether the vehicle is traveling on a curve. Beginning with the secondary motor switched on, when a traction requirement is not present, the secondary motor is not switched off until it is determined that the vehicle is not, or is no longer, traveling on a curve. A traction requirement is preferably determined at least when an expected traction requirement in the longitudinal direction is predicted when wheel slip is recognized or when the ASC control is active.

(Continued)

An expected traction requirement in the longitudinal direction is predicted when a requested longitudinal dynamic setpoint parameter exceeds a defined threshold value based on a longitudinal dynamic potential parameter.

6 Claims, 2 Drawing Sheets

(51) Int. Cl.
    *B60W 20/10*     (2016.01)
    *B60K 6/52*     (2007.10)
    *B60W 30/18*     (2012.01)

(52) U.S. Cl.
    CPC .... *B60W 30/18172* (2013.01); *Y02T 10/6265* (2013.01); *Y02T 10/6286* (2013.01); *Y10S 903/93* (2013.01)

(56) References Cited

U.S. PATENT DOCUMENTS

| | | | |
|---|---|---|---|
| 8,504,273 B2* | 8/2013 | Bonfigt | B60T 8/175 701/71 |
| 2006/0196714 A1 | 9/2006 | Sugimoto et al. | |
| 2009/0101428 A1* | 4/2009 | Itoh | B60T 8/175 180/197 |
| 2010/0133023 A1* | 6/2010 | Tang | B60L 11/1805 180/65.1 |
| 2011/0130901 A1* | 6/2011 | Mori | B60K 6/445 701/22 |
| 2012/0059547 A1* | 3/2012 | Chen | B60W 10/04 701/37 |
| 2014/0343774 A1* | 11/2014 | Wimmer | B60K 6/52 701/22 |

FOREIGN PATENT DOCUMENTS

| | | |
|---|---|---|
| CN | 104163106 A | 11/2014 |
| DE | 10 2012 211 920 A1 | 9/2014 |
| DE | 10 2013 208 965 A1 | 11/2014 |
| FR | 2 911 568 A1 | 7/2008 |

OTHER PUBLICATIONS

Chinese Office Action issued in counterpart Chinese Application No. 201410486594.1 dated May 5, 2016 with English translation (20 pages).

* cited by examiner

METHOD AND CONTROL DEVICE FOR OPERATING A ROAD-COUPLED HYBRID VEHICLE

CROSS REFERENCE TO RELATED APPLICATIONS

This application claims priority under 35 U.S.C. § 119 from German Patent Application No. 10 2013 219 085.9, filed Sep. 23, 2013, the entire disclosure of which is herein expressly incorporated by reference.

BACKGROUND AND SUMMARY OF THE INVENTION

The invention relates to a method and a control device for operating a road-coupled hybrid vehicle, having an electronic control unit, a primary motor which is associated with a first axle, and a secondary motor which is associated with a second axle, it being possible to switch between the primary axle and the secondary axle, depending on the operating strategy. The terms "primary motor" or "secondary motor" may also be understood to mean a primary or secondary drive unit, respectively, having multiple motors, such as wheel-specific drives.

Various methods for operating a road-coupled hybrid vehicle are described, for example, in German patent applications 10 2012 211 920 or 10 2013 208 965, not previously published.

German patent application 10 2012 211 920 is directed to a so-called "road-coupled" hybrid vehicle having at least one primary motor (an electric motor, for example) which acts as a drive motor on a first axle of the hybrid vehicle, and having a secondary motor (an internal combustion engine, for example) which acts as a drive motor on a second axle of the hybrid vehicle. The primary motor and the secondary motor are not coupled via a clutch, but, rather, are drive-coupled by means of the roadway via the wheels. Road-coupled hybrid vehicles of this type are also referred to as "split-axle" hybrid vehicles. An electric motor is preferably used as the primary motor, and an internal combustion engine is preferably used as the secondary motor.

Hybrid vehicles of this type are operable in particular in a first operating mode (preferably E mode for purely electric travel), in which the primary motor alone is operated for the drive control, and in a second operating mode (auto mode), in which the secondary motor may also be automatically switched on and off for the drive control.

German patent applications 10 2012 211 920 and 10 2013 208 965 relate to methods for switching on the secondary motor.

The object of the invention is to improve a hybrid vehicle of the above-mentioned type with regard to its efficiency as well as its driving stability.

This and other objects are achieved according to the invention by a method, and a corresponding control device, for operating a road-coupled hybrid vehicle, having an electronic control unit, a primary motor which is associated with a first axle, and a secondary motor which is associated with a second axle. By way of the electronic control unit, the primary motor and the secondary motor are basically controlled in a drive-oriented manner such that preferentially only a single-axle drive by the primary motor is provided. Beginning with the secondary motor switched off, when a traction requirement is determined, the secondary motor is switched on regardless of whether the vehicle is traveling on a curve. And, beginning with the secondary motor switched on, when a traction requirement is not present, the secondary motor is not switched off until travel by the vehicle on a curve is not recognized.

By means of the electronic control unit, the primary motor and the secondary motor are basically controlled in a drive-oriented manner in such a way that preferentially only a single-axle drive by the primary motor is provided.

In particular within the scope of hybrid vehicles, the term "drive-oriented control" is understood to mean not only a short-term efficiency-oriented control which solely minimizes fuel consumption, but in general also a longer-term control, oriented toward maximum availability of the requested overall power and/or electrical power, of the drive components and/or the axle-related drive torque distribution. Drive-related controls of the drive components in hybrid vehicles are also already known per se as so-called hybrid operation strategies.

When, beginning with the secondary motor switched off, a traction requirement is determined, according to the invention the secondary motor is switched on, regardless of whether the vehicle is traveling on a curve.

Alternatively or additionally, beginning with the secondary motor switched on, when a traction requirement is not, or is no longer, needed, the secondary motor is not switched off until it is determined that, in addition, the vehicle is not, or is no longer, traveling on a curve. In the present context, in the broadest sense the term "traveling on a curve" is understood to mean that even fairly small turning radii, such as during a lane change, may be included.

A traction requirement is preferably determined when an expected traction requirement in the longitudinal direction is predicted when wheel slip is recognized or when the ASC control is active.

An expected traction requirement in the longitudinal direction is predicted when a requested longitudinal dynamic setpoint parameter (in particular, driver input longitudinal acceleration) exceeds a defined threshold value based on a longitudinal dynamic potential parameter (in particular, traction-related maximum possible longitudinal acceleration).

The invention is based on the following further considerations.

According to the invention, starting from a basically prioritized default of the first operating mode (preferably E mode for purely electric travel) on the drive control side, in which the primary motor alone is to be operated, (by way of exception) the secondary motor is additionally started in a preparation phase on the driving stability control side. The preparation phase is initiated when, based on a model-based prediction, an expected traction requirement has been anticipatorily determined. In the model-based prediction, an expected traction requirement is determined at least when, based on driver input (in particular, when the accelerator pedal is depressed), a requested longitudinal acceleration (or a variable proportional thereto) in the longitudinal direction is computed which is greater than a threshold value that is based on a computed longitudinal potential variable. This starting of the secondary motor by way of exception, beginning from the first operating mode with the secondary motor switched off, is also referred to below as a "switch-on request." The switch-on request may also be made when slip between the axles is recognized, and/or when an ASC control is active. The switch-on request is fulfilled regardless of whether the vehicle is traveling on a curve.

The proportional longitudinal potential variable is equal or proportional to the maximum possible longitudinal acceleration, and is computed in such a way that in particular the instantaneous coefficient of friction and the inclination of the roadway as well as the vehicle mass are taken into account. This longitudinal potential variable may be determined, for example, using the Kamm's circle according to German patent application 10 2013 208 965 (having U.S. counterpart Ser. No. 14/277, 917), the subject matter of which is incorporated by reference herein.

If, beginning with a started secondary motor, which may be started based on either a prior switch-on request or the presence of the second operating mode (auto mode, for example) on the drive control side, a traction requirement is not, or is no longer, recognized, the secondary motor is not switched off until the vehicle is not, or is no longer, traveling on a curve. This delay according to the invention in switching off the started secondary motor until the end of a curve is also referred to below as "jolt prevention." Jolt prevention refers to the prevention of an acceleration jerk, which is undesirable for relieving strain on the driver while traveling on a curve.

In addition, a distance- and/or time-related condition may prevent a jolt in order to avoid undesirable toggling between the drive modes.

In summary, as a result of the invention, the drive control having a preferred single-axle drive (in particular, purely electric travel) is basically prioritized by the primary motor, this priority being "overridden" by way of exception by a dual-axle drive when, firstly, beginning with the secondary motor switched off, a longitudinal acceleration-based traction requirement is expected (first exception case: "switch-on request") and/or when, secondly, beginning with the secondary motor switched on without a traction requirement, travel on a curve has not ended (second exception case: "jolt prevention").

In the first exception case (switch-on request), the traction in the longitudinal direction is preferred, regardless of whether the vehicle is traveling on a curve, in particular to provide sufficient drive force. In the second exception case (jolt prevention), the reproducibility or constancy of the driving characteristic is preferred in order to simplify lateral control for the driver while traveling on a curve.

The invention is preferably applicable when electric travel is to be preferentially carried out on the drive control side for minimizing CO2 emissions, i.e., when the primary motor is an electric motor. Due to the anticipatory determination of the expected traction requirement and the preparation phase (prior to the actual traction control), the invention is also particularly advantageous when the secondary motor is a motor which requires a certain time to start, such as an internal combustion engine.

For drive-oriented travel, the primary focus is on drive strategies which optimize driving performance and fuel consumption for controlling the primary and secondary motors. In contrast, for travel which is oriented toward driving dynamics, in particular when there is a traction requirement, the primary focus is the drive torque distribution on the axles.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
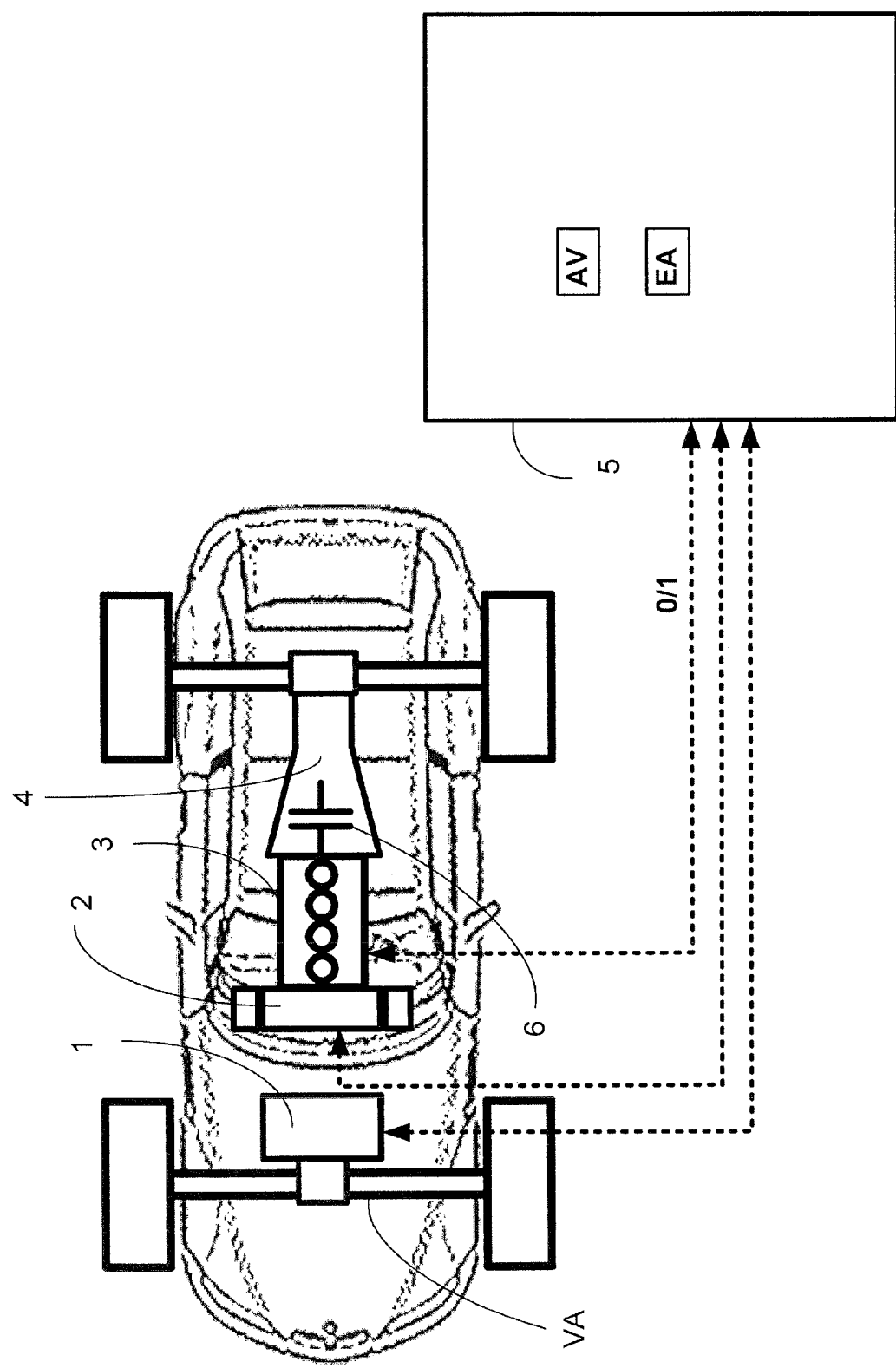
FIG. 1 is a schematic illustration of a road-coupled hybrid vehicle together with certain components used in the method according to an embodiment of the invention.

FIG. 1 illustrates a so-called road-coupled hybrid vehicle. The road-coupled hybrid vehicle has a first electric motor 1 as a primary motor, which as the drive motor acts on the front axle VA, for example, and has an internal combustion engine 3 as a secondary motor, which as the drive motor acts on the rear axle. A second electric motor 2 may be provided for starting the internal combustion engine 3. In addition, an automatic transmission 4 may be connectable to the internal combustion engine 3 on its input side. Analogously, the invention is also applicable for a different order of the components 2, 3, and 4, for example an arrangement in which the electric motor 2 is situated between the internal combustion engine 3 and the automatic transmission 4.

The hybrid vehicle may be operated in a first operating mode (E mode) in which, from the drive control side, the primary motor 1 alone is used for purely electric travel, and in a second operating mode (auto mode) in which the internal combustion engine 3, as a secondary motor, may be automatically switched on and off as needed from the drive control side with respect to the primary motor 1.

The method for controlling the operation of the hybrid vehicle is carried out by an electronic control unit 5 which executes corresponding program modules and has connections to the required sensors and actuators. The program modules "switch-on request" EA and "jolt prevention" AV are stored in memory; their mode of operation is discussed in greater detail in the description for FIG. 2.

Figure 2:
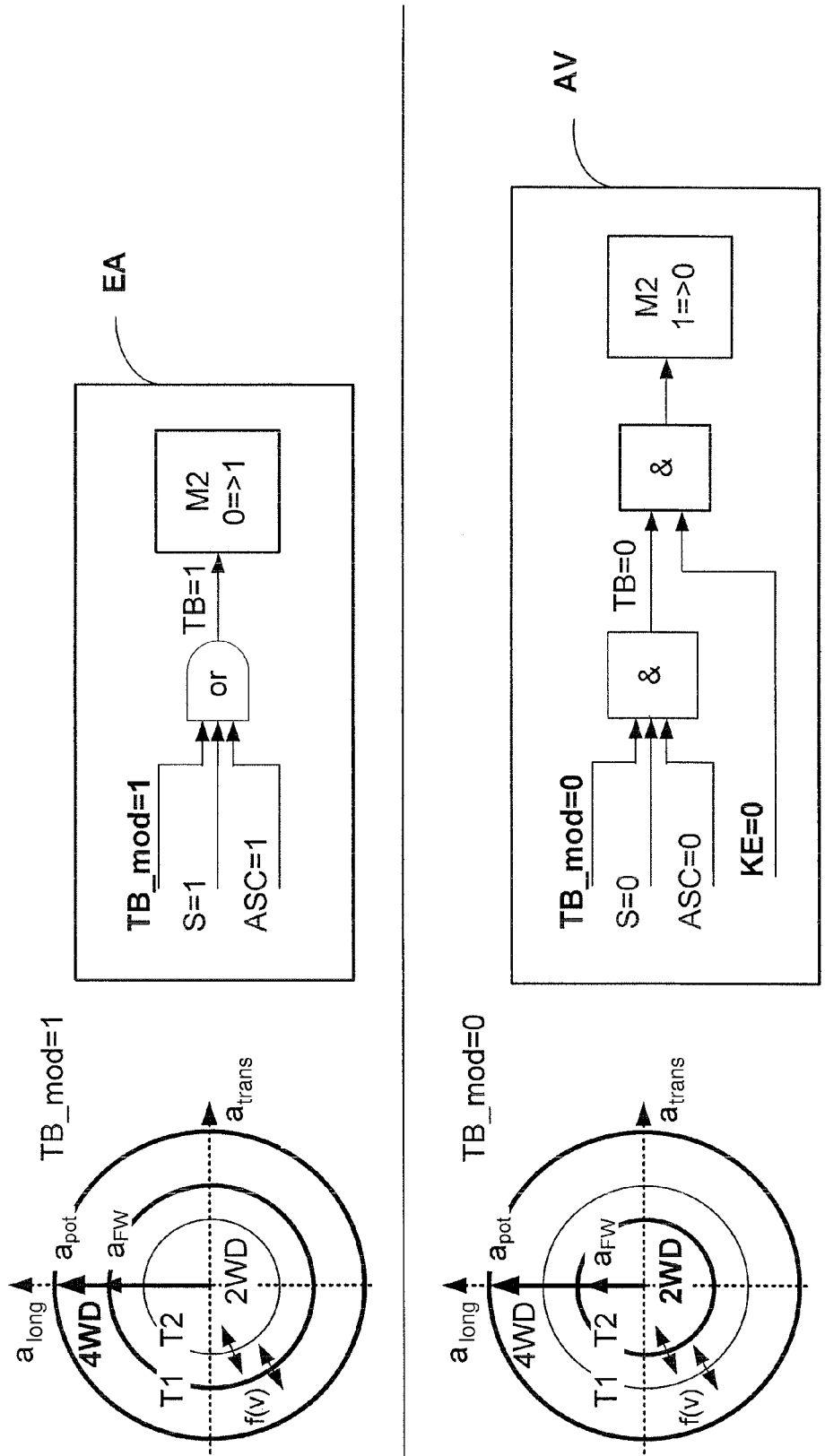
FIG. 2 is a graphical illustration of exemplary steps of the method according to an embodiment of the invention.

In FIG. 2, in each case a requested driving dynamics setpoint parameter $a_{FW}$ is compared to a driving dynamics potential parameter $a_{pot}$ by means of the Kamm's circle illustrated on the left side. In the present case, the requested driving dynamics setpoint parameter $a_{FW}$ is ascertained for the anticipatory determination of an expected traction requirement, solely from a setpoint longitudinal acceleration $a_{long}$ based on the accelerator pedal actuation. A switch is then made from the single-axle drive-oriented control 2WD to a double-axle driving dynamics-oriented control 4WD when the requested longitudinal dynamic setpoint parameter $a_{FW}$ exceeds a defined threshold value T1 (70%, for example) based on the longitudinal dynamic potential parameter $a_{pot}$ (top Kamm's circle). Thus, in the top example, an expected traction requirement TB_mod=1 is anticipatorily determined based on the model-based prediction.

The "switch-on request," beginning with the secondary motor M2 (in the present case, the internal combustion engine 3) switched off, is illustrated in the top example according to FIG. 2. Thus, if a traction requirement TB=1 is present due to the expected traction requirement TB_mod=1 (or due to recognized slip: S=1 or due to active ASC control: ASC=1), this results in switching on the secondary motor M2: 0=>1. This switch-on request EA is a preparation phase, which may follow the actual traction control. One example of the actual traction control is contained in the above-mentioned German patent application 10 2013 208 965.

In the transition from dual- or multi-axle drive 4WD to the single-axle drive 2WD, the Kamm's circle may follow a hysteresis path; in the illustrated bottom example according to FIG. 2, this transition takes place at a threshold value of T2 (50%, for example) of the potential parameter $a_{pot}$. Thus, in the bottom example, based on the model-based prediction no expected traction requirement is determined: TB mod=0.

The "jolt prevention," beginning with the secondary motor M2 (in the present case, the internal combustion engine 3) switched on, is illustrated in the bottom example according to FIG. 2. Thus, if there is no, or no longer, a traction requirement TB=0 due to no expected traction requirement TB_mod=0 (and due to no slip: S=0 and due to no ASC control: ASC=0), this results in switching off the secondary motor M2: 1=>0 only if there is no travel on a curve: KE=0. This jolt prevention AV is a follow-up phase, so to speak, which may follow the actual traction control.

The driving dynamics, or in the present case, the purely longitudinal dynamic potential parameter $a_{pot}$, is/are in particular a function of the coefficient of friction, the inclination, the air resistance and/or the drag mass.

The threshold values T1 and T2 for the transition from the drive-oriented control to the driving dynamics-oriented control and vice versa are preferably a function of the instantaneous vehicle speed v (see function f(v) indicated by the double arrows in FIG. 2).

In one refinement of the invention, the traction requirement may be specified as a function of time and distance. Likewise, anticipatory information (for example, curve shapes via navigation data, via X-to-X communication systems, or via surroundings sensors) may be taken into account for recognizing a traction requirement. The driver may be provided with options for individual setting and modification of the base function according to the invention via defined control elements integrated into the vehicle, or via mobile terminals (using an "app," for example).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a road-coupled hybrid vehicle equipped with an electronic control unit, a primary motor associated with a first axle, and a secondary motor associated with a second axle, the method comprising the acts of:
   controlling, via the electronic control unit, the primary motor and the secondary motor in a drive-oriented manner such that operation with only a single-axle drive by the primary motor is a default primary operating mode;
   determining via curve recognition whether the hybrid vehicle is travelling on a curve;
   in a first state where the secondary motor is switched off, switching on the secondary motor when a traction requirement is present at the electronic control unit; and
   in a second state after the secondary motor is switched on in the first state, when the traction requirement is not present at the electronic control unit, not switching off the secondary motor until it is determined that the vehicle is not traveling on a curve.

2. The method according to claim 1, further comprising the act of:
   determining the occurrence of the traction requirement when an expected traction requirement in a longitudinal direction of the vehicle is predicted and one of: a wheel slip is recognized or an automatic stability control (ASC) control is active.

3. The method according to claim 2, wherein the expected traction requirement in the longitudinal direction is predicted when a requested longitudinal dynamic setpoint parameter exceeds a defined threshold value, the defined threshold value being based on a longitudinal dynamic potential parameter.

4. A method of operating a road-coupled hybrid vehicle equipped with an electronic control unit, a primary motor associated with a first axle, and a secondary motor associated with a second axle, the primary motor and the secondary motor being controlled via the electronic control unit in a drive-oriented manner in a default primary single-axle drive operating mode, the method comprising the acts of:
   comparing a requested longitudinal dynamic setpoint parameter to a longitudinal dynamic potential parameter;
   predicting whether a traction requirement is expected;
   in a first state in which the secondary motor is switched off and the expected traction requirement is predicted, switching the secondary motor on in response to a switch-on request in a preparation phase for traction control when a defined threshold value based on the longitudinal dynamic potential parameter is exceeded;
   determining via curve recognition whether the hybrid vehicle is travelling on a curve; and
   in a second state after the secondary motor is switched on in the first state, when a traction requirement is not present, switching-off the secondary motor only upon determining, via curve recognition, that the hybrid vehicle is not traveling on the curve.

5. A control device for operating a road-coupled hybrid vehicle equipped with a primary motor associated with a first axle and a secondary motor associated with a second axle, the control device comprising:
   an electronic control unit programmed to execute a switch-on request function by:
   controlling the primary motor and the secondary motor in a drive-oriented manner in a default primary single-axle drive operating mode,
   comparing a requested longitudinal dynamic setpoint parameter to a longitudinal dynamic potential parameter,
   predicting whether a traction requirement is expected;
   beginning in a first state with a secondary motor switched off and the expected traction requirement is predicted, in response to a switch-on request switching on the secondary motor in a preparation phase for traction control when a defined threshold value based on the longitudinal dynamic potential parameter is exceeded;
   determining by curve recognition whether the hybrid vehicle is travelling on a curve; and
   beginning in a second state after the secondary motor switched on in the first state, switching off the secondary motor when a traction requirement is not present only once it is determined by curve recognition that the vehicle is not traveling on the curve to provide jolt prevention.

6. A control device for operating a road-coupled hybrid vehicle equipped with a primary motor associated with a first axle and a secondary motor associated with a second axle, the control device comprising:
   an electronic control unit programmed to carry out a switch-on request function and a jolt prevention function by:
   controlling the primary motor and the secondary motor in a drive-oriented manner such that operation with only a single-axle drive by the primary motor is a default primary operating mode, when a traction requirement is present at the electronic control unit, switching on the secondary motor when in a first state with the secondary motor being switched off;
determining whether the hybrid vehicle is travelling on a curve; and
when the traction requirement is not present at the electronic control unit, in a second state after the secondary motor is switched on from the first state, not switching off the secondary motor until the hybrid vehicle is determined to not be traveling on the curve.

* * * * *